(12) United States Patent
D'Aponte et al.

(10) Patent No.: US 11,912,454 B2
(45) Date of Patent: Feb. 27, 2024

(54) PACKAGING PLANT AND A METHOD FOR PACKAGING PRODUCTS

(71) Applicant: Fameccanica.Data S.p.A., San Giovanni Teatino (IT)

(72) Inventors: Francesco D'Aponte, San Giovanni Teatino (IT); Diego Gualtieri, San Giovanni Teatino (IT); Matteo Antonioli, San Giovanni Teatino (IT)

(73) Assignee: Fameccanica.Data S.p.A. (IT)

( * ) Notice: Subject to any disclaimer, the term of this patent is extended or adjusted under 35 U.S.C. 154(b) by 0 days.

(21) Appl. No.: 17/679,161

(22) Filed: Feb. 24, 2022

(65) Prior Publication Data

US 2022/0281630 A1    Sep. 8, 2022

(30) Foreign Application Priority Data

Mar. 3, 2021  (EP) .................................... 21160398

(51) Int. Cl.
| | | |
|---|---|---|
| *B65B 65/00* | (2006.01) | |
| *B65B 59/00* | (2006.01) | |
| *B65B 57/00* | (2006.01) | |
| *B65G 1/04* | (2006.01) | |

(52) U.S. Cl.
CPC ............ *B65B 65/006* (2013.01); *B65B 57/00* (2013.01); *B65B 59/001* (2019.05); *B65G 1/0492* (2013.01); *B65B 2210/02* (2013.01); *B65B 2220/18* (2013.01)

(58) Field of Classification Search
None
See application file for complete search history.

(56) References Cited

U.S. PATENT DOCUMENTS

| | | | |
|---|---|---|---|
| 6,535,777 B1 * | 3/2003 | Kohler .................. | B65G 37/02 700/112 |
| 10,065,798 B2 * | 9/2018 | Borders ................. | B65G 65/00 |
| 10,392,190 B1 * | 8/2019 | Theobald ................ | B25J 9/161 |
| 2018/0074478 A1 * | 3/2018 | Burkhard ............... | G06Q 50/04 |
| 2018/0178992 A1 | 6/2018 | Gondoh et al. | |
| 2019/0092570 A1 * | 3/2019 | Macdonald .......... | G05D 1/0234 |
| 2020/0319648 A1 | 10/2020 | Eckman | |
| 2021/0047122 A1 * | 2/2021 | Issing .................. | B65G 47/642 |
| 2022/0009090 A1 * | 1/2022 | Morikubo .................. | B25J 9/16 |

OTHER PUBLICATIONS

Boysen Nils et al, "Warehousing in the e-commerce era: A survey", European Journal of Operational Research, Elsevier, Amsterda, NL, vol. 288, No. 2. (Aug. 23, 2018).
European Search Report dated Aug. 5, 2021. 4 pages.

* cited by examiner

*Primary Examiner* — Tanzim Imam
(74) *Attorney, Agent, or Firm* — RMCK Law Group PLC

(57) ABSTRACT

A packaging plant and packaging method for packaging consumer products simultaneously in a large distribution packaging format and in customized e-commerce formats. The packaging plant and packaging method significantly improve the sustainability of e-commerce packaging of consumer products in that an e-commerce packaging area is supplied by products coming directly from a manufacturing machine without being previously packaged into large distribution packages.

8 Claims, 3 Drawing Sheets

PACKAGING PLANT AND A METHOD FOR PACKAGING PRODUCTS

CROSS-REFERENCE TO RELATED APPLICATION

This application claims priority to European Patent Application No. 21160398.0 filed Mar. 3, 2021. The disclosure of the above application is incorporated herein by reference in its entirety.

FIELD OF THE INVENTION

The present invention relates in general to the field of packaging, in particular to the field of packaging of consumer products.

More specifically, the invention relates to a packaging plant for packaging consumer products in different packaging formats.

The present invention has been developed with the aim of packaging consumer products either in a standard packaging format intended for large distribution channels or in customized packaging formats intended for e-commerce.

In the following, reference will be made to this specific field without however losing generality.

Embodiments of the present invention relate to a method for flexible packaging of products.

DESCRIPTION OF THE RELATED ART

Consumer products are typically manufactured by manufacturing machines having a very high production rate, typically of several hundred pieces per minute.

Each manufacturing machine typically produces a flow of a single type of products. The manufacturing machines may periodically change the type of product which is manufactured (for instance the size of the product). When the manufacturing machine can be configured for changing the type of products, typically the manufacturing machine produces batches of products, wherein each batch is made of products of a single type.

The flow of products at the output of the manufacturing machines is sent to a packaging unit. Typically, the packaging unit is configured for packaging the products in a format suitable for the large distribution. Typically, the large distribution packaging format consists of relatively large packages (for instance flexible bags or cardboard boxes) containing all the same number of one single type of product. The products forming the large distribution packages are typically packaged in a package which may comprise a primary package and a secondary package.

With the ever-growing diffusion of e-commerce, many consumer product manufacturers have started distributing consumer products both through large distribution channels and through e-commerce channels.

While the large distribution requires standard packages containing a fixed relatively large number of a single type of product, e-commerce distribution systems require small number of products to be packaged in highly customized packages corresponding to the order of the final customer. Typically, an e-commerce order includes different types of products, with a variable number of products for each type of product.

The automated packaging units used for packaging consumer products directed to the large distribution do not have the flexibility required for the e-commerce distribution.

In the state of the art, consumer products at the output of manufacturing machines are all packaged in large distribution packaging formats. E-commerce orders are prepared by i) opening the large distribution packages, ii) extracting from the large distribution packages the required type and number of products, and iii) packaging the composition of products corresponding to a specific order in e-commerce packaging containers. These operations are typically carried out manually.

The traditional e-commerce distribution of consumer products involves a large use of manpower and a great waste of packaging material. In fact, the packages in which the consumer products have previously been packaged for shipping to the large distribution are wasted, which has a negative impact on sustainability of the packaging process.

There is therefore a need for packaging systems and methods which allow both high-volume packaging of consumer products in the format required by the large distribution and high flexibility packaging for e-commerce distribution.

One of the main problems for carrying out flexible packaging of different products is that often the different products are manufactured by production machines which may have quite different production rates. The different production rates of different manufacturing machines make it difficult to coordinate the production rates of different manufacturing machines with the packaging rates of the packaging machines. When the need arises to package groups of consumer products with variable number of products and different types of products supplied by different manufacturing machines, these activities are typically carried out offline, i.e. in a station which is not in-line with respect to the production machines and to the packaging machines. Typically, packaging operations in these cases are carried out by operators who manually group the consumer products in relation to the specific customised packages corresponding to the orders of the final customer.

The solutions which involve the use of operators for manual packaging are slow and subject to multiple non-monitorable errors. Human errors in the composition of manual packaging are problematic in that it is difficult to implement actions which prevent such errors from happening again.

Other known solutions require frequent modifications of the packaging plant in order to process and package different combinations of groups of consumer products. This significantly increases cost and production times.

The prior art solutions have additional problems with the packaging of groups of consumer products with a considerable difference in the number of products in different packages, for instance ten consumer products in a first package and three consumer products in a second package. The known solutions have the additional limitation that they do not allow the production of consumer products at the maximum rate allowed by the manufacturing machines.

OBJECT AND SUMMARY OF THE INVENTION

The object of the present invention is to provide a packaging plant and a packaging method for the flexible packaging of consumer products which overcomes the drawbacks and limitations of the prior art.

Another object of the present invention is to provide a packaging plant and method which have an improved sustainability with respect to the prior art solutions, specifically with respect to the elimination of the waste of packaging material due to the re-packaging operations of the prior art.

Another object of the invention is to provide a packaging plant and method for the flexible packaging of groups of consumer products that does not require modifications to the packaging plant or the use of operators for packaging groups of consumer products comprising different number and/or different types of consumer products.

An additional object of the invention is to provide a packaging plant and method for producing packages containing a variable number of consumer products, even with highly different number of consumer products in different packages and which can vary the number and types of consumer products to be packaged without the need of stopping or slowing-down the production rate.

In accordance with the present invention, these objects are achieved by a packaging plant having the features of claim 1 and by a packaging method.

Optional features of the invention form the subject of the dependent claims.

The claims are an integral part of the teachings submitted in relation to the invention.

BRIEF DESCRIPTION OF THE DRAWINGS

Further characteristics and advantages of the invention will become clear from the following description, given purely as a non-limiting example, with reference to the attached drawings, wherein.

DETAILED DESCRIPTION

Figure 1:
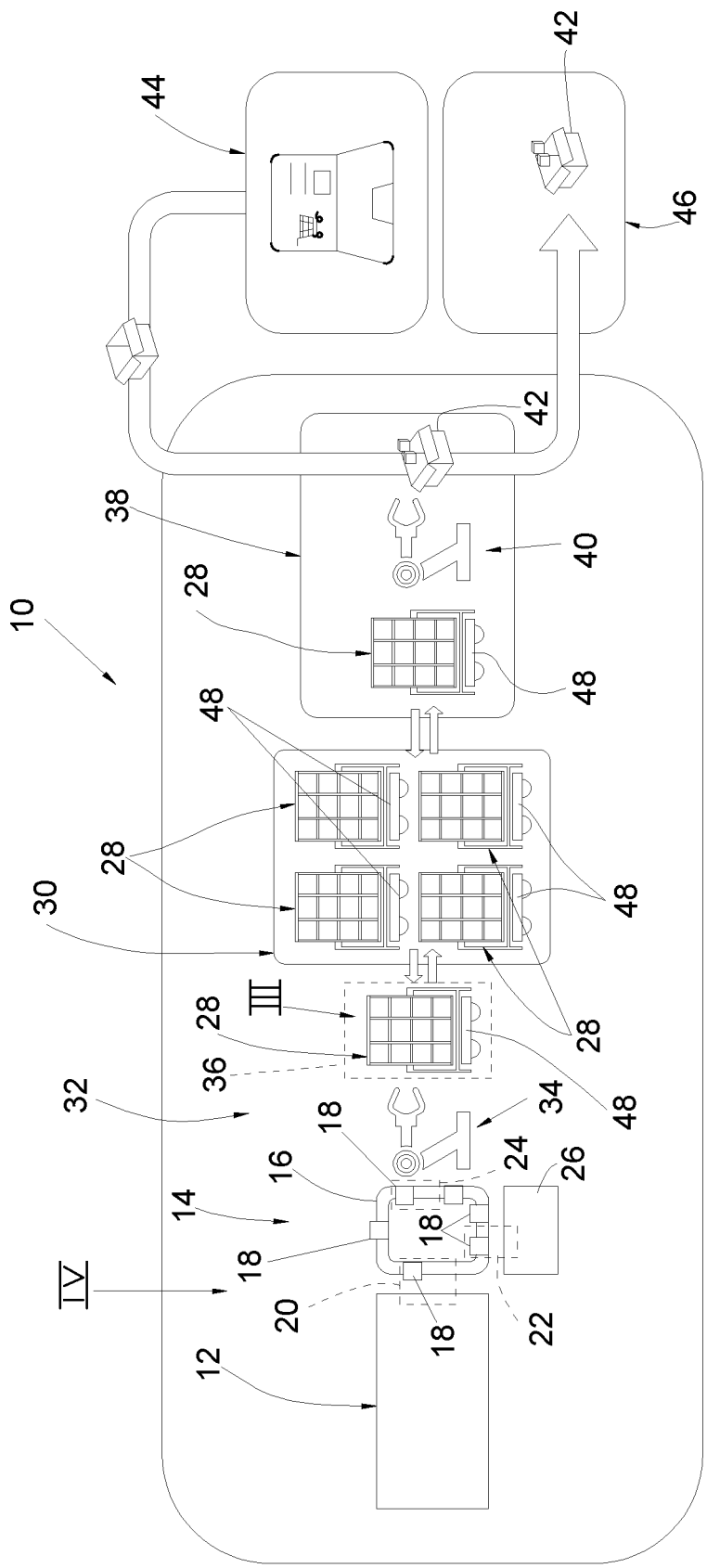
FIG. 1 is a schematic view of a packaging plant according to a possible embodiment of the present invention.

With reference to FIG. 1, a packaging plant for packaging consumer products is indicated by 10.

The packaging plant 10 comprises at least one manufacturing machine 12 configured for manufacturing at least one flow of consumer products. The manufacturing machine 12 may be configured for manufacturing a single type of product or subsequent batches of different types of products.

The packaging plant 10 comprises a conveyor system 14 including at least one stationary guide 16 and a plurality of transport units 18 which are movable independently of each other along the stationary guide 16. The conveyor system 14 may be a linear motor system wherein the stationary guide 16 is the stator of the linear motor system and the transport units 18 are movers of the linear motor system which are magnetically coupled to the stationary guide 16. Each transport unit 18 is provided with a holding element configured for receiving and holding therein an individual consumer product or a group of consumer products.

The conveyor system 14 has at least one input station 20, at least one first output station 22 and at least one second output station 24. The conveyor system 14 comprises a control unit which controls the movement of the transport units 18 along the stationary guide 16 between the input station 20, first output station 22 and second output station 24. The transport units 18 are configured for receiving the products from the manufacturing machine 12 in the input station 20 and for releasing the products in the first output station 22 or in the second output station 24. The movement of the transport units 18 along the stationary guide 16 can be controlled independently of each other, with different speeds and accelerations, so that one or more transport units 18 can be momentarily stationary in the input station 20 or in the output stations 22, 24 while other transport units 18 move between the stations 20, 22, 24.

The packaging plant 10 comprises at least one large distribution packaging unit 26 which receives the products from the transport units 18 at the first output station 22.

The definition "large distribution packaging unit" defines a packaging unit which is configured for packaging products in the format required by the large distribution. Typically, consumer products directed to the large distribution are packaged in standard formats which include a fixed number of products in each package. Typically, the large distribution packaging format includes many products of a single type.

The large distribution packaging unit 26 is configured for receiving the products from the transport units 18 in the first output station 22 and for packaging said products in a packaging bag or container, with a fixed number of products of a single type in each package. Typically, the large distribution packaging unit 26 does not have the capability of varying the number of products in each package or of packaging different types of products in each package.

The packaging plant 10 comprises a plurality of movable stocking units 28. Each stocking unit 28 may have the shape of a cabinet having a plurality of horizontal shelves. Each shelf may be shaped for receiving a single consumer product or a group of consumer products. The shelves of each movable stocking unit 28 may receive consumer products of different types.

The packaging plant 10 comprises a stocking area 30 configured for receiving a plurality of movable stocking units 28. The stocking area 30 may contain stocking units which are fully or partially filled with consumer products or empty stocking units 28.

The packaging plant 10 comprises a clustering area 32 including at least one clustering robot 34 and at least one clustering station 36. The clustering robot 34 is configured for picking individual products or groups of products from the transport units 18 in the second output station 24 and for placing the products or groups of products into selected shelves of a stocking unit 28 placed in the clustering station 36.

The packaging plant 10 comprises a flexible packaging area 38 including at least one packaging robot 40. The packaging robot 40 is configured for picking products or groups of products from the shelves of a stocking unit 28 placed in the flexible packaging area 38 and for placing a variable number of products in packaging containers 42.

The packaging robot 40 may operate under the control of an e-commerce server 44 which receives orders from an e-commerce network. Each order may include different types of products and a variable number of products for each type of product. For instance, an e-commerce order may be structured as shown in the following table:

| Type of Product | No. of Products |
| --- | --- |
| A | X |
| B | Y |
| C | Z |
| . . . | . . . |

The number of different types of products A, B, C, . . . depend on the number of different products which may be manufactured by the manufacturing machine 12. The number of products X, Y, Z of each type of product may vary depending on the specific order.

The e-commerce server 44 sends packaging orders to the packaging robot 40. The packaging robot 40 picks in the shelves of the stocking unit 28 placed in the flexible packaging area 38 the desired type of products A, B, C, . . . in the respective quantities X, Y, Z, . . . and places the products in the packaging container 42.

The packaging robot 40 may pick from the shelves of the stocking unit 28 groups of products, wherein each group of products is formed by a number of products selected in a fixed range of numbers. The groups of products may be combined to reach the number of products required by the specific e-commerce order.

For instance, each group of products may be formed by a number of products selected among 1, 2, 3, 5, 10 products. If, for instance, the e-commerce order is for 14 products, the packaging robot 40 may pick three groups of products formed, respectively, by 10, 2, 2 products, or 10, 3, 1 products, or other combinations based on the predetermined number of products. The choice of the combination of the groups of products may be made on the basis of the availability of the groups of products in the stocking unit 28. This procedure optimizes the operation of the packaging robot 40 by reducing the number of movements of the packaging robot 40 which are necessary for composing the specific e-commerce orders.

When the order is complete, the packaging container 42 is sent to a shipping area 46. The packaging containers 42 formed in the flexible packaging area 38 are completely different from the packages formed by the large distribution packaging unit 26 in that each flexible packaging 42 may be different from any other package and may be made of a variable number of products and of different types of products, whereas the packages formed by the large distribution packaging unit are typically composed of one single type of product in a fixed quantity.

In a possible embodiment, individual products or groups of products intended to be delivered to the flexible packaging area 38 may be packaged in primary packages at the exit of the manufacturing machine 12. This is important especially when the products should be protected against contamination, for instance if the products are sanitary products (e.g. absorbent sanitary products) or the like.

Figure 4:
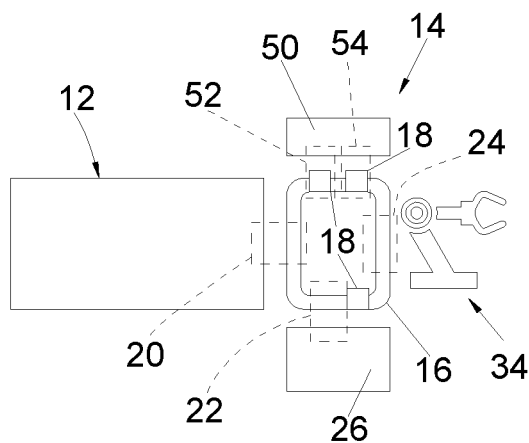

With reference to FIG. 4, in a possible embodiment the packaging plant 10 may comprise a primary packaging unit 50 having an input 52 and an output 54. The primary packaging unit 50 may be configured to: receiving individual products or groups of products intended to be delivered to the flexible packaging area 38 from the transport units 18 at the input 52, packaging individual products or groups of products into primary packages (e.g. flexible bags), and delivering the packaged individual products or groups of products at the output 54. The individual products or groups of products packaged into respective primary packages may be picked at the output 54 of the primary packaging unit 50 by the transport units 18. The clustering robot 34 may pick from the transport units 18 the individual products or groups of products packaged into respective primary packages and place such products or groups of products into the shelves of the stocking unit 28 placed in the clustering station 36. Alternatively, the clustering robot 34 may pick the individual products or groups of products packaged into the respective primary packages directly at the output 54 of the primary packaging unit 50 and place such products or groups of products into the shelves of the stoking unit 28 placed in the clustering station 36.

Figure 5:
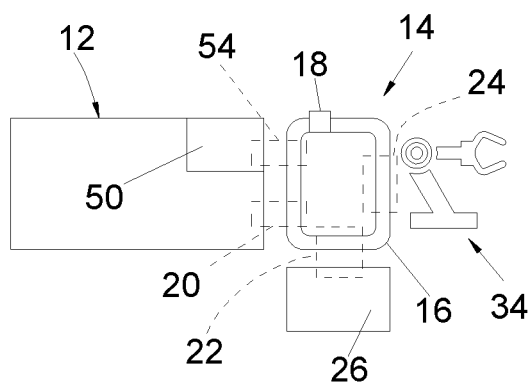

With reference to FIG. 5, in a possible embodiment at least one manufacturing machine 12 may comprise a primary packaging unit 50 configured for drawing-off individual products or groups of products intended to be delivered to the flexible packaging area 38 from the flow of products at the end of the manufacturing machine 12 and for delivering such products or groups of products packaged into respective primary packages at the output 54, where they are picked by the transport units 18. The products intended to be delivered to the large distribution packaging unit 26 are supplied to the input station 20 of the conveyor system 14.

In a possible embodiment, individual products or groups of products may be packaged into respective primary packages in the flexible packaging area 38. The packaging robot 40 may be configured for sealing individual products or groups of products in flexible bags, before placing the products in the packaging containers 42.

Figure 3:
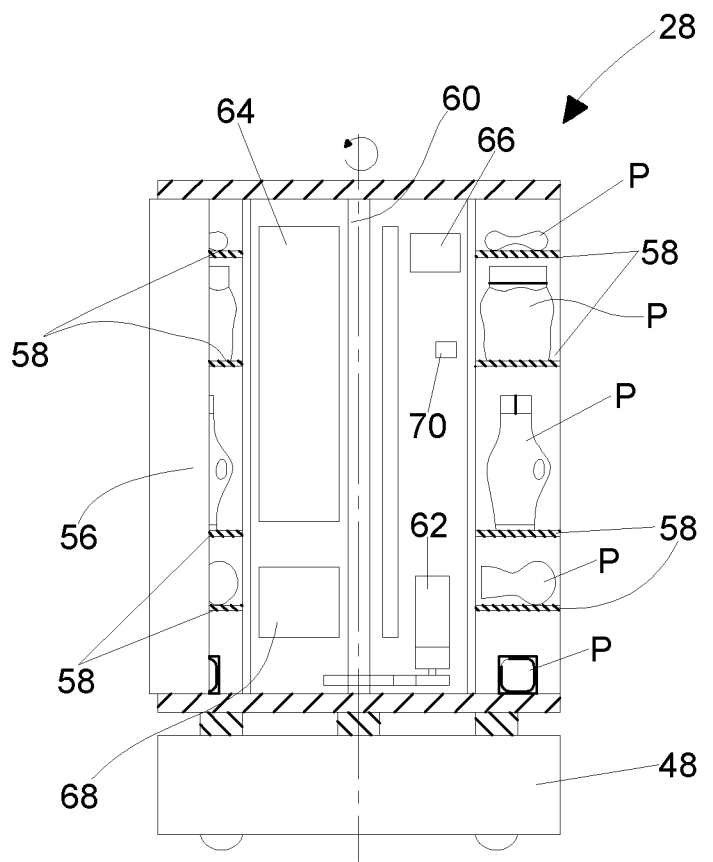
FIG. 3 is a schematic view of a stocking unit indicated by the arrow III in FIG. 1, and FIGS. 4 and 5 are schematic views of alternative embodiments of the part indicated by the arrow IV in FIG. 1.

In a possible embodiment, the stoking units 28 may be configured to isolate the products contained therein from the outside environment. For instance, with reference to FIG. 3, each stoking unit 28 may have at least one door 56 movable from an open position to a closed position. In the open position the inner room of the stoking unit 28 is accessible for placing the products P on the shelves 58 and for removing the products P from the shelves 58. In the closed position the inner room of the stoking unit 28 is isolated from the outside environment to prevent contamination of the products P. In a possible embodiment, the door 56 of each stoking unit 28 may be a sliding door carried by a rotatable central vertical shaft 60. Each stoking unit 28 may comprise a motor 62 for controlling the movement of the sliding door 56 from the open position to the closed position, and vice versa. Each stoking unit 28 may comprise a battery 64 for supplying the motor 62 and other auxiliary devices such as, for instance, a cooler 66, an air purifier 68, sensors 70 (for instance a temperature sensor, a humidity sensor, an air quality sensor, etc.).

In possible embodiments, the packaging plant 10 may comprise a plurality of automated guided vehicles 48 configured for releasably engaging the stoking units 28. The automated guided vehicles 48 may transport the stocking units 28 between the clustering station 36, the stocking area 30 and the flexible packaging area 38. Once the stocking units 28 have been positioned in the clustering station 36, stocking area 30 or flexible packaging area 38, the automated guided vehicle 48 may disengage from the stocking unit 28 and may be used for moving another stocking unit 28. The number of the automated guided vehicles 48 may be substantially less than the number of the stocking units 28 since only a small part of the total number of stocking unit 28 must be moved at the same time.

In a possible embodiment (not shown), the conveyor system 14 may comprise a planar surface forming the stationary guide 16. The transport units 18 may be magnetically coupled to the planar surface. The transport units may be movable on the planar surface in any direction and may also rotate about respective axes orthogonal to the planar surface. The transport units 18 might weigh the products they carry, so that a count of the number of products deposited on the transport units 18 can be based on the weight acting on each transport unit 18. Each transport unit 18 may be assigned to a specific product package and the transport units 18 may populate a storing area waiting to serve the packaging robot 40 on the basis of orders coming from the e-commerce sever 44.

Figure 2:
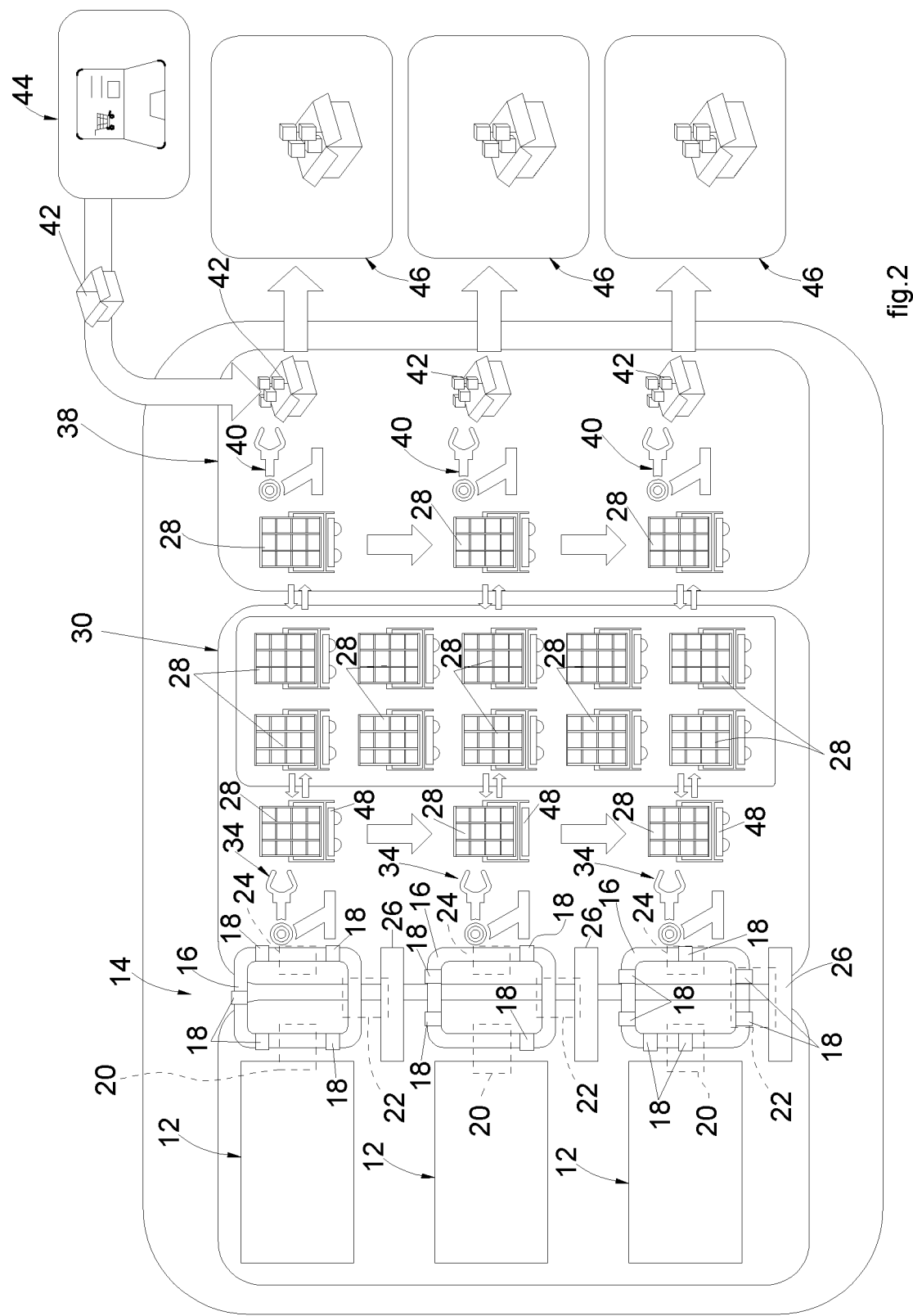
FIG. 2 is a schematic view of another possible embodiment of a packaging plant according to the present invention.

With reference to FIG. 2, the packaging plant 10 may comprise a plurality of manufacturing machines 12, each of which may be configured for manufacturing a single type of product or a plurality of different types of products (for instance products with different sizes). In the embodiment of FIG. 2, the conveyor system 14 may comprise a plurality of stationary guides 16 associated to respective manufacturing machines 12. Each stationary guide 16 may comprise a respective input station 20 and respective first and second output stations 18, 22.

In possible embodiments, the transport units 18 may be configured for passing from one stationary guide to another. The stationary guides 16 may be physically separated from each other (i.e. without any structural connection with each other) and may face each other in at least one transfer section. An example of a conveyor system of this type is disclosed in the international application no. PCT/IB2020/058329 of the same applicant (not yet published at the date of filing of the present application).

The transport units 18 carrying the products intended to be delivered to the flexible packaging area 38 may pass from one stationary guide 16 to another in order to bring different products to different second output stations 24.

In the embodiment of FIG. 2, each stationary guide may have a respective first output station 22 associated to a respective large distribution packaging unit 26. In a possible embodiment, the conveyor system 14 may have one single large distribution packaging unit 26.

In the embodiment of FIG. 2, the plurality of manufacturing machines 12 may be associated to respective input stations 20 of respective stationary guides 16 as schematically shown in FIG. 2. In a possible embodiment, a plurality of manufacturing machines 12 may supply the respective flows of products to respective input stations 20 of a single stationary guide 16.

In the embodiment shown in FIG. 2, the packaging plant 10 may comprise a plurality of clustering robots 34 each of which may be associated to a respective second output station 24 of the conveyor system 14.

In a possible embodiment, the flexible packaging area 38 may comprise a plurality of packaging robots 40, each of which is configured for picking products from a respective stocking unit 28 placed in the flexible packaging area 38. Each packaging robot 40 may be configured for placing the products in a respective packaging container 42, if necessary, after sealing the products into flexible bags. In a possible embodiment, two or more packaging robots 40 may be configured for placing products picked from respective stocking unit 28 in the same packaging container 42.

In operation the packaging plant 10 is controlled by a central control unit which is programmed to implement a packaging method comprising the following steps:
  producing at least one flow of products,
  receiving the products into a plurality of transport units 18 movable independently of each other along at least one stationary guide 16 of a conveyor system 14 having at least one input station 20, at least one first output station 22, and at least one second output station 24, wherein the transport units 18 receive the products in the input station 20 and release the products at one of the output stations 22, 24,
  receiving the products at the first output station 22 in at least one large distribution packaging unit 26 in which the products are packaged in a large distribution packaging format,
  picking the products from said transport units 18 at the at least one second output station 24 by means of at least one clustering robot 34, and placing said products into selected shelves of a movable stocking unit 28 placed in at least one clustering station 36,
  stocking a plurality of movable stocking units 28 containing said products in the respective shelves in a stocking area 30,
  placing at least one of the stocking units 28 in a flexible packaging area 38, and
  picking products from the shelves of the movable stocking units 28 placed in the flexible packaging area 38 by means of at least one packaging robot 40 and placing a variable number of products in packaging containers 42.

The packaging method may comprise producing at least two flows of different products. The flows of different products may be provided by a single manufacturing machine 12 or by a plurality of manufacturing machines 12 each of which may be configured for providing a flow of a single type of products.

The flows of different products may be directed to a single input station 20 of the conveyor system 14 or to two or more input stations 20 of the conveyor system 14. When the packaging plant operates with two or more flows of different products, the different products may be directed to two or more large distribution packaging units 26, each of which may be configured for packaging a single type of products.

The packaging method may comprise moving the movable stocking units 18 between the clustering station 36, the stocking area 30 and the flexible packaging area 38 by means of automated guided vehicles 48 configured for releasably engaging the movable stocking units 28.

The packaging method may comprise moving the transport units 18 between at least two distinct stationary guides of the conveyor system 14, by selectively activating first and second magnetic elements of each of the transport units 18.

When the packaging plant operates with flows of different products, the conveyor system 14 may be provided with two or more second output stations 24 dedicated to respective types of products. Each output station 18 may be associated to a respective clustering robot 34 which is dedicated to picking and transferring only one type of product.

Each stocking unit 28 may contain different products. Therefore, in the flexible packaging station 38, the packaging robot 40 may prepare a packaging order containing different quantities of different products by picking the different products in the same stocking unit 28. When a stocking unit 28 is empty or when the stocking unit 28 has finished the products of a certain type, the stocking unit 28 is removed from the flexible packaging station 28 and is transferred to the clustering station 36 where it is filled with a complete set of different products.

The products to be delivered to the flexible packaging area 38 may be drawn-off from the manufacturing machines 12 and placed into the shelves of a movable stocking unit 28 placed in at least one clustering station 36 only when the total number of said products present in the stocking units 28 is below a predetermined threshold.

This allows optimization of the operation. If there are no orders of a certain type of product, there is no need to draw-off that type of products from the manufacturing machines. On the contrary, when there are orders which finish the stock of a certain type of product, the products of that type are drawn-off in the quantity necessary to comply with the orders and to restore the stock.

The stocking unit 20 forms a buffer between the manufacturing machines 12 and the flexible packaging station 38 which allows the flexible packaging area 38 to operate at maximum capacity even in case of momentary interruptions of the manufacturing machine 12.

The packaging plant 10 according to the present invention is capable of forming simultaneously standard packages intended to be distributed through large distribution channels and highly customised packages corresponding to individual orders placed through an e-commerce network.

A significant aspect of the present invention is that the products intended for the e-commerce packaging come directly from the manufacturing machines without being previously packaged into large distribution packages. This is a significant sustainability improvement as compared to prior art solutions wherein the products for e-commerce distribution are first packaged into large distribution packages and then the large distribution packages are opened for composing the e-commerce orders.

The solution according to the present invention provides a substantial contribution to sustainability of e-commerce packaging in that it eliminates waste of large distribution packaging material.

Also, the solution according to the present invention reduces significantly the use of manpower for the e-commerce packaging.

The specific embodiments disclosed herein may be varied or modified without departing from the scope of the invention as defined by the following claims.

The invention claimed is:

1. A packaging plant, comprising:
    at least one manufacturing machine configured for manufacturing at least one flow of products,
    a conveyor system including at least one stationary guide and a plurality of transport units movable independently of each other along said at least one stationary guide, the conveyor system having at least one input station, at least one first output station and at least one second output station, wherein said transport units are configured for receiving the products in said at least one input station from said at least one manufacturing machine and for releasing the products in one of said at least one first output station and said at least one second output station,
    at least one large distribution packaging unit configured for receiving the products from said transport units in said at least one first output station and for packaging said products in a large distribution packaging format,
    a plurality of movable stocking units each comprising a plurality of shelves configured for receiving said products,
    a stocking area configured for receiving said movable stocking units,
    a clustering area including at least one clustering robot and at least one clustering station, the at least one clustering robot being configured for picking the products from said transport units in said at least one second output station and for placing said products into selected shelves of a movable stocking unit of the plurality of movable stocking units placed in said at least one clustering station, and
    a flexible packaging area including at least one packaging robot configured for picking products from shelves of a movable stocking unit of the plurality of movable stocking units placed in said flexible packaging area and for placing a variable number of the products into packaging containers.

2. The packaging plant of claim 1, further comprising a primary packaging unit having an input and an output and configured for receiving individual products or groups of products from the transport units at the input, packaging the individual products or the groups of products into primary packages, and delivering the primary packages at the output.

3. The packaging plant of claim 1, wherein said at least one manufacturing machine comprises a primary packaging unit configured for drawing-off individual products or groups of products from the at least one flow of products at an end of the at least one manufacturing machine and for delivering the individual products or the groups of products packaged into respective primary packages at an output where they are picked by said transport units.

4. The packaging plant of claim 1, wherein said at least one packaging robot is configured for sealing individual products or groups of products into flexible bags before placing said individual products or said groups of products into said packaging containers.

5. The packaging plant of claim 1, wherein the at least one manufacturing machine comprises at least two manufacturing machines configured for manufacturing respective flows of different products.

6. The packaging plant of claim 1, wherein the conveyor system comprises at least two distinct stationary guides having respective first output stations associated to respective large distribution packaging units of the at least one large distribution packaging unit.

7. The packaging plant of claim 1, comprising a plurality of automated guided vehicles, each of which is configured for releasably engaging a movable stocking unit of the plurality of movable stocking units and for moving said movable stocking unit between said at least one clustering station, said stocking area, and said flexible packaging area.

8. The packaging plant of claim 1, wherein the at least one stationary guide of the conveyor system comprises at least two distinct stationary guides having respective first and second output stations, wherein said at least two distinct stationary guides are physically separated from each other and face each other in at least one transfer section,
    wherein said plurality of transport units are configured to pass from one to another of said distinct stationary guides at said at least one transfer section, and wherein each of said transport units is provided with first and second magnetic elements selectively activatable so that each of said transport units can be transferred from one to another of said physically separated distinct stationary guides.

* * * * *

UNITED STATES PATENT AND TRADEMARK OFFICE
CERTIFICATE OF CORRECTION

| | | |
|---|---|---|
| PATENT NO. | : 11,912,454 B2 | Page 1 of 1 |
| APPLICATION NO. | : 17/679161 | |
| DATED | : February 27, 2024 | |
| INVENTOR(S) | : Francesco D'Aponte, Diego Gualtieri and Matteo Antonioli | |

It is certified that error appears in the above-identified patent and that said Letters Patent is hereby corrected as shown below:

On the Title Page

Item (71) Applicant address information should be listed as:
- Fameccanica.Data S.p.A., San Giovanni Teatino (Chieti), ITALY -

Item (72) Inventor address information should be listed as:
- Francesco D'APONTE, San Giovanni Teatino (Chieti), ITALY
Diego GUALTIERI, San Giovanni Teatino (Chieti), ITALY
Matteo ANTONIOLI, San Giovanni Teatino (Chieti), ITALY -

Signed and Sealed this
Eleventh Day of March, 2025

Coke Morgan Stewart
*Acting Director of the United States Patent and Trademark Office*